United States Patent
Suzuki et al.

(10) Patent No.: US 8,678,893 B2
(45) Date of Patent: Mar. 25, 2014

(54) VIDEO GAME THAT VARIES DISPLAY OF AN OPPOSING CHARACTER BASED ON VISIBILITY TO A PLAYER CHARACTER

(75) Inventors: Eiji Suzuki, Minato-ku (JP); Hajime Matsumaru, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1289 days.

(21) Appl. No.: 12/294,682

(22) PCT Filed: Mar. 6, 2007

(86) PCT No.: PCT/JP2007/054258
§ 371 (c)(1),
(2), (4) Date: Sep. 26, 2008

(87) PCT Pub. No.: WO2007/111089
PCT Pub. Date: Oct. 4, 2007

(65) Prior Publication Data
US 2010/0240451 A1     Sep. 23, 2010

(30) Foreign Application Priority Data
Mar. 27, 2006   (JP) ................ 2006-086731

(51) Int. Cl.
*A63F 13/00* (2006.01)

(52) U.S. Cl.
USPC ............. 463/4; 463/3; 463/7; 463/8; 463/9; 463/31

(58) Field of Classification Search
USPC ............................... 463/2–4, 7–9
See application file for complete search history.

(56) References Cited

U.S. PATENT DOCUMENTS 5,853,324 A * 12/1998 Kami et al. .............. 463/2

(Continued)

FOREIGN PATENT DOCUMENTS

EP      1080756 A2    3/2001

(Continued)

OTHER PUBLICATIONS

"Combat Mission—Beyond Overlord manual", 1997-2001, Battlefront.com, pp. 14, 23, 98-101 (Total 13 Sheets). Retrieved from the Internet <URL:http://www.replacementdocs.com/download.php?view.4612>.*

"Combat Mission—Beyond Overlord—Wikipedia". From Wikipedia, The Free Encyclopedia. [online], [retrieved on Nov. 4, 2011]. Retrieved from the Internet <URL:http://en.wikipedia.org/wiki/Combat_Mission:_Beyond_Overlord>. 3 pages.*

"East Front II manual", 1998, Talonsoft, pp. 1-4, 20-23 (Total 5 Sheets). Retrieved from the Internet <URL:http://www.replacementdocs.com/download.php?view.8440>.*

(Continued)

*Primary Examiner* — Lawrence Galka
(74) *Attorney, Agent, or Firm* — Sughrue Mion, PLLC

(57) ABSTRACT

To provide a game system capable of preferably producing a picture in which a first game character loses sight of a second game character having moved so as to disappear from the view of the first game character. The present invention relates to a game system for displaying on a display unit (82*a*) a picture of a display target area in a common game space where a first game character corresponding to a game machine A (10*a*) and a second game character corresponding to a game machine B (10*b*) are placed. A position condition determination unit (78*a*) determines whether or not a position of the second game character included in the display target area satisfies a position condition based on the position and orientation of at least one of the first game characters. A display control unit (80*a*; display restriction means) restricts display output of the second game character included in the display target area on the display unit (82*a*), based on a result of determination.

15 Claims, 11 Drawing Sheets

(56) References Cited

U.S. PATENT DOCUMENTS

| | | | |
|---|---|---|---|
| 6,424,353 B2* | 7/2002 | Yamamoto et al. | 345/619 |
| 6,501,478 B1* | 12/2002 | Kawakami et al. | 345/474 |
| 6,676,518 B1 | 1/2004 | Sawa et al. | |
| 6,890,262 B2* | 5/2005 | Oishi et al. | 463/31 |
| 8,043,149 B2* | 10/2011 | Ortiz et al. | 463/2 |
| 2001/0036852 A1* | 11/2001 | Shigeno | 463/4 |
| 2002/0165028 A1 | 11/2002 | Miyamoto et al. | |
| 2003/0144045 A1* | 7/2003 | Fujita | 463/1 |
| 2003/0186741 A1 | 10/2003 | Hayashida et al. | |
| 2004/0157661 A1 | 8/2004 | Ueda et al. | |
| 2004/0176163 A1* | 9/2004 | Ishihata et al. | 463/30 |

FOREIGN PATENT DOCUMENTS

| | | |
|---|---|---|
| JP | 2001-137537 A | 5/2001 |
| JP | 2001-149658 A | 6/2001 |
| JP | 2002-325963 A | 11/2002 |
| JP | 2003-210848 A | 7/2003 |
| JP | 2004-073241 A | 3/2004 |
| JP | 2004-242728 A | 9/2004 |
| TW | 527201 B | 4/2003 |

OTHER PUBLICATIONS

"East Front 2 Gamespot review", [dated May 20, 1999], [online],[retrieved Nov. 4, 2011]. Retrieved from the Internet <URL:http://www.gamespot.com/pc/strategy/eastfront2therussianfront/review.html?tag=summary%3Bread-review>. 3 pages.*

"East Front II manual", 1998, Talonsoft, pp. 1-4, 8, 20-23, 63, 64 and 239-242 (Total 10 Sheets). Retrieved from the Internet <URL:http://www.replacementdocs.com/download.php?view.8440>.*

Taiwanese Search Report corresponding to Taiwanese Patent Application No. 096108711, dated May 17, 2010. Partial English language translation.

EIDOS Interactive: "Commandos 2: Men of Courage"; Game Manual, http://www.replacementdocs.com/request.php?388>; (2001).

Splinter Cell Chaos Theory, game manual and screen-shots, (c) Ubisoft Mar. 30, 2005 screen shot.

European Office Action corresponding to European Patent Application No. 07715226.2, dated Mar. 1, 2010.

"J. League Pro Soccer Club o Tsukuro! 3", Saka Tsuku 3, Koshiki Guide, Kabushiki Kaisha Aspect, Sep. 4, 2003, p. 57, First edition.

Hissho Koryakuho, "Super Mario Kart" Futanasha publishers Ltd., Jul. 5, 1997, pp. 8 and 9.

* cited by examiner

1 : NETWORK GAME SYSTEM

FIG.11

| PLAYER ID | POSITION KIND | POSITION | ORIENTATION | BALL HOLDING FLAG | OPERATION TARAGET FLAG |
|---|---|---|---|---|---|
| A01 | GK | $(PX_{a01}, PY_{a01}, PZ_{a01})$ | $(DX_{a01}, DY_{a01}, DZ_{a01})$ | 0 | 0 |
| A02 | DF | $(PX_{a02}, PY_{a02}, PZ_{a02})$ | $(DX_{a02}, DY_{a02}, DZ_{a02})$ | 0 | 1 |
| ⋮ | ⋮ | ⋮ | ⋮ | ⋮ | ⋮ |
| A11 | FW | $(PX_{a11}, PY_{a11}, PZ_{a11})$ | $(DX_{a11}, DY_{a11}, DZ_{a11})$ | 0 | 0 |
| B01 | GK | $(PX_{b01}, PY_{b01}, PZ_{b01})$ | $(DX_{b01}, DY_{b01}, DZ_{b01})$ | 0 | 0 |
| ⋮ | ⋮ | ⋮ | ⋮ | ⋮ | ⋮ |
| B10 | FW | $(PX_{b10}, PY_{b10}, PZ_{b10})$ | $(DX_{b10}, DY_{b10}, DZ_{b10})$ | 0 | 0 |
| B11 | FW | $(PX_{b11}, PY_{b11}, PZ_{b11})$ | $(DX_{b11}, DY_{b11}, DZ_{b11})$ | 1 | 1 |

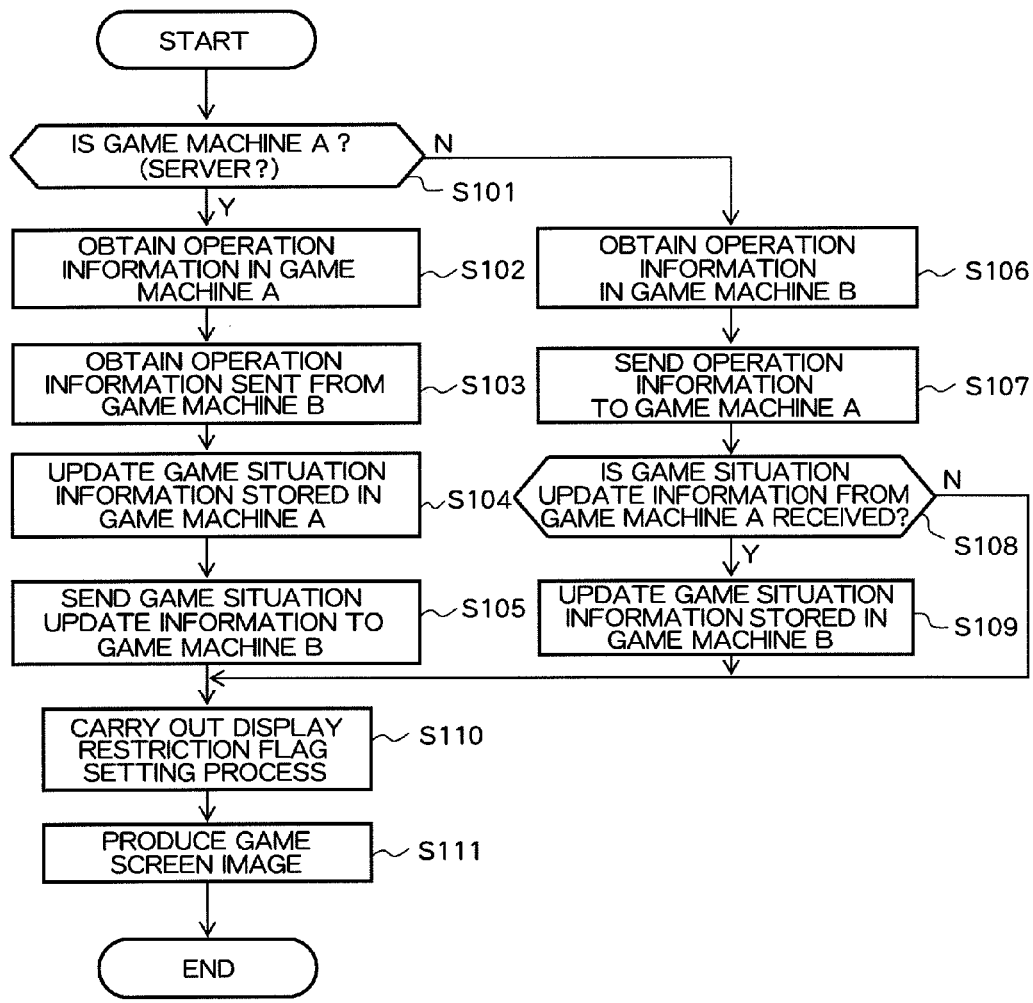

VIDEO GAME THAT VARIES DISPLAY OF AN OPPOSING CHARACTER BASED ON VISIBILITY TO A PLAYER CHARACTER

TECHNICAL FIELD

The present invention relates to a game system, a game machine, a game machine control method, and an information storage medium.

BACKGROUND ART

There is known a game system which comprises a first game machine and a second game machine, for realizing a soccer game to be played by a user's operation target team related to the first game machine and another user's operation target team related to the second game machine.
Patent Document 1: Japanese Patent Laid-open Publication No. 2001-149658

DISCLOSURE OF THE INVENTION

Problems to be Solved by the Invention

In an actual soccer match, a player A of an attack side team may move (action) in a way referred to as "pull away". That is, the player A may move so as to disappear from the view of a player B of the defense side team, who covers the player A. In other words, the player A may move to a position which cannot be captured, together with the ball at the same time, in the view of the player B. In this case, the player B loses sight of the player A, and thus may delay in taking an action to respond to (defend against) the player A in a case such as when the player A receives the ball. As a result, the player A having received the ball can take a subsequent action free from being blocked by the player B. With a picture preferably produced in the above described game machine, in which, e.g., the player B who loses sight of the player A having moved as described above, new excitement can be provided to the user.

The present invention has been conceived in view of the above, and an object of the present invention is to provide a game machine, a game machine control method and an information storage medium capable of showing a picture of a first game character who loses a second game character having moved so as to disappear from the view of the first game character.

Means for Solving the Problems

In order to achieve the above described objects, according to one aspect of the present invention, there is provided a game system including first operation means, second operation means, first display means corresponding to the first operation means, and second display means corresponding to the second operation means, for displaying on the first display means a picture of a display target area in a common game space where one or more first game characters corresponding to the first operation means and one or more second game characters corresponding to the second operation means are placed, the game system comprising: position condition determination means for determining whether or not a position of the second game character included in the display target area among the one or more second game characters satisfies a position condition based on a position and orientation of at least one of the one or more first game characters; and display restriction means for restricting display output of the second game character included in the display target area among the one or more second game characters on the first display means, based on a result of determination by the position condition determination means.

Also, according to another aspect of the present invention, there is provided a game machine included in a game system comprising a first game machine and a second game machine, as the first game machine, comprising display means for displaying a picture of a display target area in a common game space where one or more first game characters corresponding to the first game machine and one or more first game characters corresponding to the second game machine are placed, and display restriction means for restricting display output of the second game character included in the display target area among the one or more second game characters, on the display means, based on a result of determination as to whether or not a position of the second game character included in the display target area, among the one or more second game characters, satisfies a position condition based on a position and orientation of at least one of the one or more first game characters.

Also, according to still another aspect of the present invention, there is provided a control method for controlling a game machine included in a game system comprising a first game machine and a second game machine, as the first game machine, the control method comprising a step of displaying on display means a picture of a display target area in a common game space where one or more first game characters corresponding to the first game machine and one or more first game characters corresponding to the second game machine, are placed, and a display restriction step of restricting display output of the second game character included in the display target area among the one or more second game characters, on the display means, based on a result of determination as to whether or not a position of the second game character included in the display target area, among the one or more second game characters, satisfies a position condition based on a position and orientation of at least one of the one or more first game characters.

Also, according to yet another aspect of the present invention, there is provided a program for causing a computer, such as, e.g., a personal computer, a consumer game machine, a portable game machine, a commercial game machine, a portable phone, a personal digital assistant (PDA), and so forth, to function as a first game machine in a game system comprising the first game machine and a second game machine, the computer functioning as display means for displaying a picture of a display target area in a common game space where one or more first game characters corresponding to the first game machine and one or more first game characters corresponding to the second game machine are placed, and display restriction means for restricting display output of the second game character included in the display target area among the one or more second game characters, on the display means, based on a result of determination as to whether or not a position of the second game character included in the display target area, among the one or more second game characters, satisfies a position condition based on a position and orientation of at least one of the one or more first game characters.

Also, according to yet another aspect of the present invention, there is provided a computer readable information storage medium recording the above described program. According to yet another aspect of the present invention, there is provided a program distribution device comprising an information storage medium recording the above described program, for reading the program from the information storage medium, and distributing. According to yet another aspect of the present invention, there is provided a program distribution method for reading the program from an information storage medium recording the above described program, and distributing.

The present relates to a game system including first operation means, second operation means, first display means corresponding to the first operation means, and second display means corresponding to the second operation means and different from the first display means, for displaying, on the first display means, a picture of a display target area in a common game space where one or more first game characters corresponding to the first operation means and one or more second game characters corresponding to the second operation means are placed. Note that the "common game space" includes a three dimensional game space formed using three coordinate elements, and a two dimensional game space formed using two coordinate elements. According to the present invention, whether or not the position of a second game character included in the display target area among the one or more second game characters satisfies a position condition based on a position and orientation of at least one of the one or more first game characters is determined. Then, display output of the second game character included in the display target area among the one or more second game characters on the first display means is restricted, based on a result of the determination. According to the present invention, a picture in which a first game character loses sight of a second game character having moved so as to disappear from the view of the first game character can be preferably produced.

In one embodiment of the present invention, the display restriction means may control a degree of semi-transparency of the second game character included in the display target area among the one or more second game characters, based on the result of determination by the position condition determination means.

In one embodiment of the present invention, the display restriction means may control a display size of the second game character included in the display target area among the one or more second game characters, displayed on the first display means, based on the result of determination by the position condition determination means.

In one embodiment of the present invention, the position condition may include a condition as to whether or not an angle formed by a reference direction of the first game character and a direction from the first game character to the second game character is included in a predetermined angle range.

In one embodiment of the present invention, the position condition determination means may include means for controlling the angle range, based on a predetermined parameter value of at least one of the first game character and the second game character.

In one embodiment of the present invention, at least a part of the display target area may be displayed on the second display means, the display restriction means, in the case where the position of the second game character included in the display target area among the one or more second game characters satisfies the position condition, may restrict display output of the second game character on the first display means, and the game system may include distinctive display means, in the case where the position of the second game character included in the display target area among the one or more second game characters satisfies the position condition, and the second game character is displayed on the second display means, for distinctively displaying the second game character on the second display means.

BRIEF DESCRIPTION OF THE DRAWINGS

FIG. 11 is a drawing showing one example of a player state table;

FIG. 12 is a drawing showing one example of the display restriction table;

FIG. 13 is a flowchart of a process to be carried out in the game machine;

BEST MODE FOR CARRYING OUT THE INVENTION

In the following, one example of an embodiment of the present invention will be described in detail with reference to the accompanying drawings. Note that an example in which the present invention is applied to a network game system, or one aspect of a game system according to the present invention, will be described.

Figure 1:
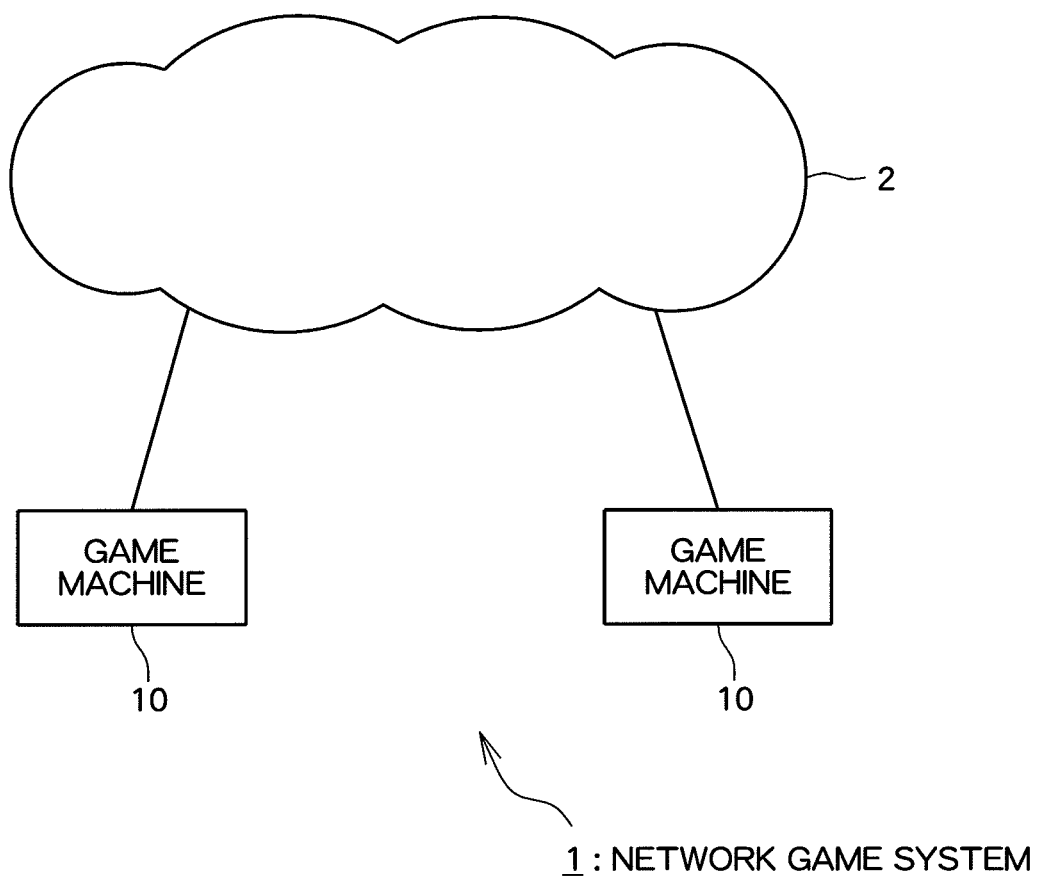
FIG. 1 is a drawing showing an entire structure of a network game system according to an embodiment of the present invention.

FIG. 1 is a diagram showing an entire structure of a network game system according to an embodiment of the present invention. As shown in the drawing, the network game system 1 comprises a plurality of game machines 10, and any game machine 10 is connected to a communication network 2, such as the Internet or the like, for mutual data exchange. The game machine 10 is formed using, e.g., a general consumer game machine, a portable game machine, a personal digital assistant, a portable phone, a personal computer, or the like. The following description is based on the assumption that the game machine 10 is formed using a consumer game machine.

Figure 2:
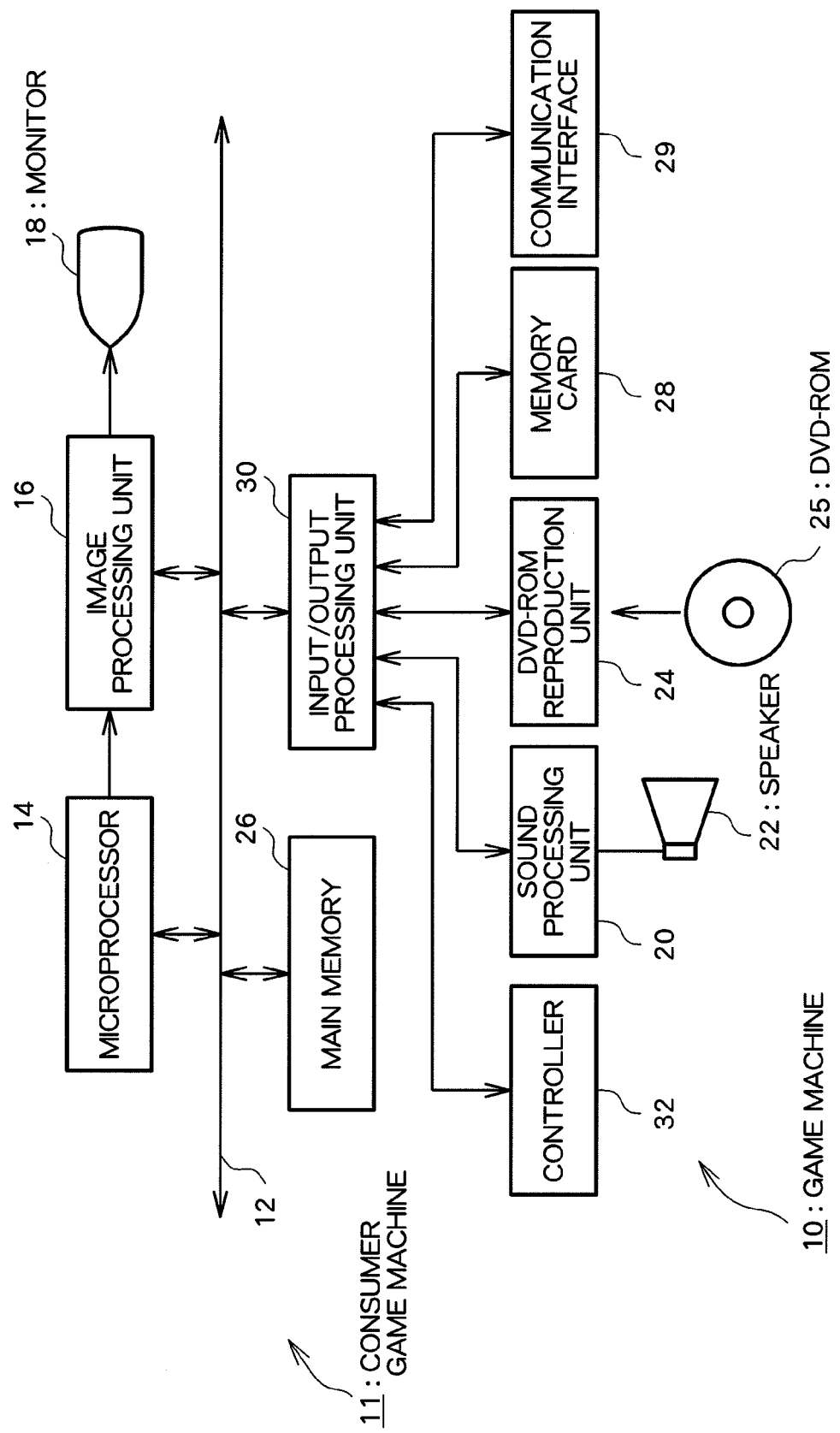
FIG. 2 is a drawing showing a hardware structure of a game machine.

FIG. 2 is a diagram showing a structure of the game machine 10. The game machine 10 comprises a consumer game machine 11, a DVD-ROM 25, a memory card 28, a monitor 18, and a speaker 22. The DVD-ROM 25 and memory card 28 are information storage media. The DVD-ROM 25 and memory card 28 are mounted in the consumer game machine 11. The monitor 18 and speaker 22 are connected to the consumer game machine 11. For example, the monitor 18 may be a home-use television set receiver, and the speaker 22 may be a built-in speaker thereof.

The consumer game machine 11 is a publicly known computer game system comprising a bus 12, a microprocessor 14, an image processing unit 16, a sound processing unit 20, a DVD-ROM reproduction unit 24, a main memory 26, a communication interface 29, an input/output processing unit 30, and a controller 32. The respective structural elements other than the controller 32 are accommodated in an enclosure.

The bus 12 is used for exchanging an address and/or data among the respective units of the consumer game machine 11. The microprocessor 14, image processing unit 16, main memory 26, and input/output processing unit 30 are connected via the bus 12 for data exchange.

The microprocessor 14 controls the respective units of the consumer game machine 11, based on an operating system stored in a ROM (not shown), a program read from the DVD-ROM 25, and data read from the memory card 28. The main memory 26 comprises a RAM, for example, into which a program read from the DVD-ROM 25 and/or data read from the memory card 28 is written when required. The main memory 26 is also used as a working memory of the microprocessor 14.

The image processing unit 16, which comprises a VRAM, renders a game screen image into the VRAM, based on the image data sent from the microprocessor 14, then converts the rendered game screen image into a video signal, and outputs to the monitor 18 at a predetermined time.

The input/output processing unit 30 is an interface via which the microprocessor 14 accesses the sound processing unit 20, DVD-ROM reproduction unit 24, memory card 28, communication interface 29, and controller 32. The sound processing unit 20, DVD-ROM reproduction unit 24, memory card 28, communication interface 29, and controller 32 are connected to the input/output processing unit 30.

The sound processing unit 20 comprises a sound buffer, in which various sound data, such as game music, game sound effects, message, and so forth, read from the DVD-ROM 25 is stored. The sound processing unit 20 reproduces the various sound data stored in the sound buffer, and outputs via the speaker 22.

The DVD-ROM reproduction unit 24 reads a program from the DVD-ROM 25 according to an instruction from the microprocessor 14. It should be noted that although the DVD-ROM 25 is used here to provide a program to the consumer game machine 11, any other information storage medium, such as a CD-ROM, a ROM card, or the like, may be used instead. Alternatively, a program may be provided via a communication network 2 from a remote place to the consumer game machine 11.

The memory card 28 comprises a nonvolatile memory (for example, EEPROM, or the like). The consumer game machine 11 has a plurality of memory card slots defined therein each for accepting a memory card 28. The memory card 28 can be removed from to the memory card slot, and stores various game data, such as saved data, or the like.

The communication interface 29 is used for exchanging data used by the game machine 10 via the communication network 2 relative to another computer (a game machine 10). The communication interface 29 sends various data to another computer according to an instruction from the microprocessor 14, and also receives various data sent from another computer and provides to the microprocessor 14.

The controller 32 is a general purpose operation input means for inputting various game operations by a user. The input/output processing unit 30 scans the states of the respective units of the controller 32 at a constant cycle (e.g., every $\frac{1}{60}^{th}$ of a second), and sends an operation signal describing the scanning result to the microprocessor 14 via the bus 12. The microprocessor 14 determines a game operation carried out by the user, based on the operation signal.

In the above described network game system 1, a soccer match game to be played by users related to the respective game machines 10 is realized. Note that the following description is based on the assumption that two game machines (hereinafter referred to as game machines A and B) are included in the network game system 1, and that a soccer match game to be played by a user (hereinafter referred to as a user A) related to the game machine A and a user (hereinafter referred to as a user B) related to the game machine B is realized in the network game system 1.

Figure 3:
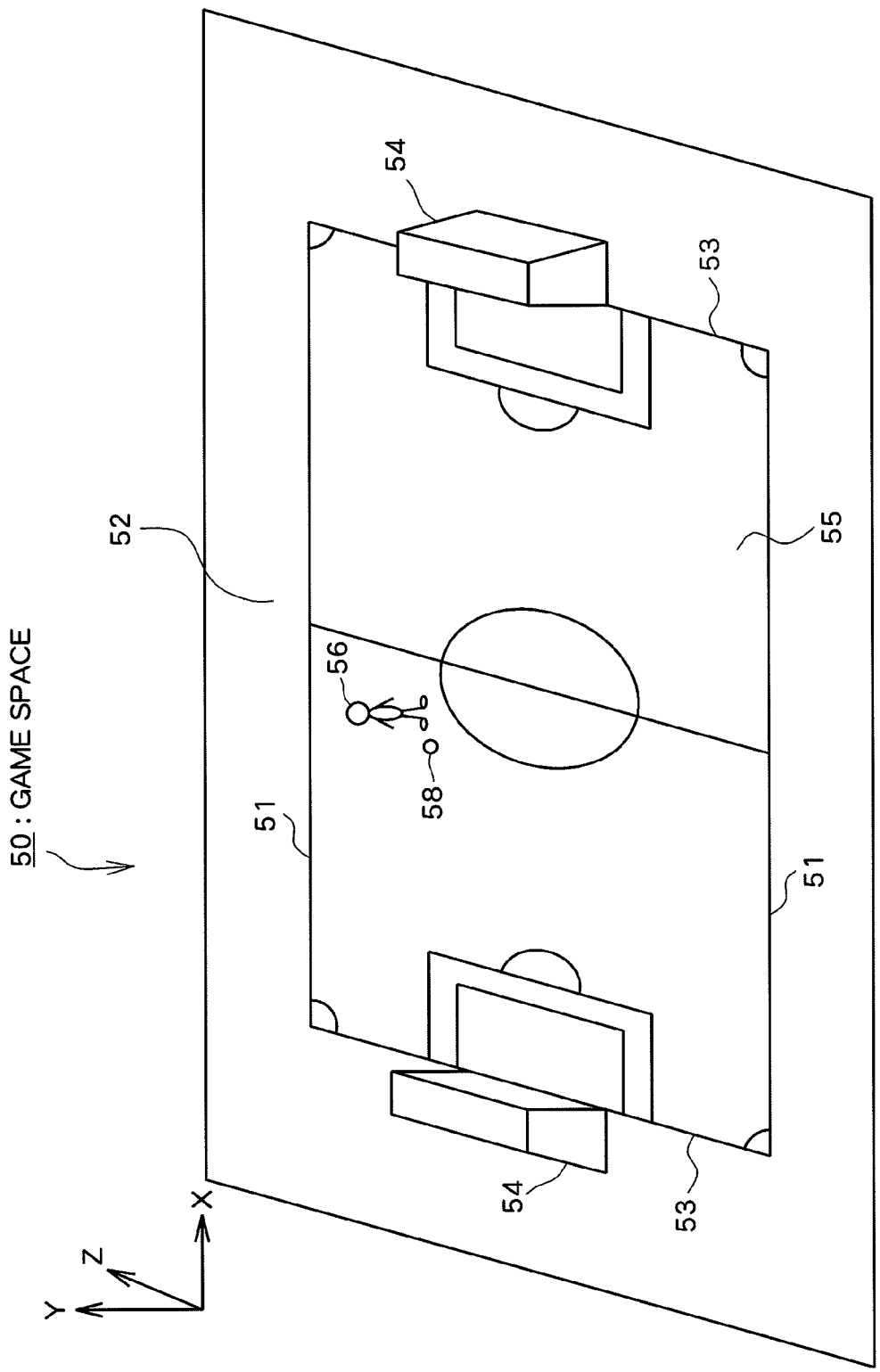
FIG. 3 is a diagram showing one example of a game space.

In the main memories 26 of the game machines A and B, a common game space (a virtual three-dimensional space) is formed. FIG. 3 is a diagram showing one example of the game space. As shown in the drawing, a field object 52 representing a soccer pitch and goal objects 54 representing goals are placed in the game space 50, constituting a game field for soccer matches. The field object 52 is placed parallel to the XZ plane. The player object 56 representative of a soccer player and a ball object 58 representative of a soccer ball are placed on the field object 52. It should be noted that although only one player object 56 is shown in FIG. 3, eleven player objects 56 belonging to the user A's operation target team (hereinafter referred to as the team A) and another eleven player objects 56 belonging to the user B's operation target team (hereinafter referred to as the team B) are actually placed.

Any of the player objects 56 belonging to the team A serves as the user A's operation target. The user A's operation target player object 56 takes various actions according to the contents of an operation carried out by the user A (contents of an operation carried out relative to the controller 32 of the game machine A). Similarly, any of the player objects 56 belonging to the team B serves as the user B's operation target. The user B's operation target player object 56 takes various actions according to the contents of an operation carried out by the user B (contents of an operation carried out relative to the controller 32 of the game machine B). The operation targets of the users are switched among the player objects 56 of the respective users' operation target teams according to the movement of the ball object 58 and/or the users' switching operations.

The player objects 56 other than the users' operation target player objects 56 act according to operation by the computer. Any of the four position kinds, namely, "forward (FW)", "midfielder (MF)", "defender (DF)", and "goal keeper (GK)" are assigned to each player object 56. The player objects 56 other than the users A and B' operation target player objects 56 act according to the position kinds assigned thereto.

With the distance between the player object 56 and the ball object 58 becoming smaller than a predetermined reference distance (a ball holding determination reference distance), the player object 56 is made associated with the ball object 58 under a predetermined condition, and the ball object 58 with that association moves according to the movement of the player object 56. This is expressed as the player object 56 being engaged in a dribble action. With the operation target player object 56 associated with the ball object 58, the user can cause the operation target player object 56 to kick the ball object 58. That is, the user can cause the operation target player object 56 to make a pass action, a shoot action, and so forth. It should be noted that a state in which the player object 56 is associated with the ball object 58 is hereinafter described as "a state in which the player object 56 holds the ball object 58".

One of the two goal objects 54 is associated with the team A, while the other with the team B. The ball object 58 having moved into the goal object 54 associated with one of the teams makes a score event for the other team.

In the game space 50, a virtual camera which moves according to the movement of, e.g., the ball object 58 is set. A game screen image showing a picture of the game space 50 viewed from the virtual camera is shown on the monitors 18 of the respective game machines A and B. Note that although the above description is based on the assumption that a common virtual camera (a single virtual camera) is set with respect to the game machines A and B, separate virtual cameras may be set for the respective game machines A and B.

Figure 4:
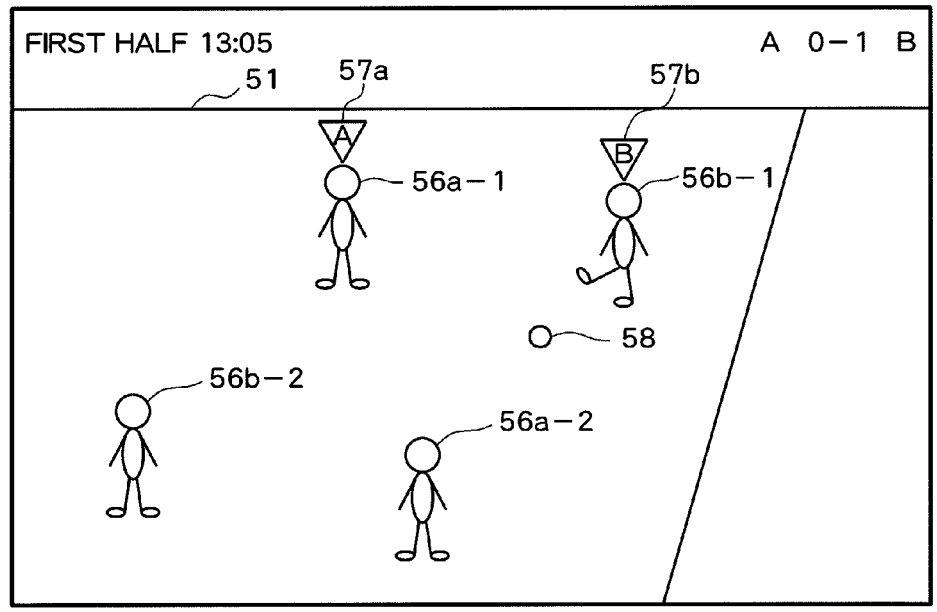
FIG. 4 is a diagram showing one example of a game screen image.

FIG. 4 shows one example of a game screen image shown on the monitors 18 of the game machines A and B. The game screen image shows a picture of an area (a display target area) in the game space 50, the area specified based on the position (a viewpoint position) and orientation (a viewing direction) of the virtual camera. In the shown game screen image, player objects 56a-1, 56a-2 of the team A, player objects 56b-1, 56b-2 of the team B, and the ball object 58 are shown. The player object 56a-1 is the user A's operation target player object 56, while the player object 56b-1 is the user B's operation target player object 56. Operation target player indicator marks 57a, 57b are shown above the player objects 56a-1, 56b-1, respectively, so that the respective users can recognize their operation target player objects 56 at a glance. The user A operates the controller 32 while looking at the game screen image shown on the monitor 18 of the game machine A, making an action instruction (a moving instruction, a dribble instruction, a pass instruction, a shoot instruction, and so forth) with respect to the player object 56a-1. Similarly, the user B operates the controller 32 while looking at the game screen image shown on the monitor 18 of the game machine B, making an action instruction with respect to the player object 56b-1.

In the following, a technique for preferably producing a picture in which a defender player object 56 of one team, in the case where a forward player object 56 of another team moves so as to disappear from the view of the defender player object 56, loses sight of the forward player object 56, is described.

In the case where there exists a player object 56 who satisfies all of the conditions 1 to 6 described below among the player objects 56 of the team B, display output of the player object 56 on the monitor 18 (a game screen) of the game machine A is restricted. Similarly, in the case where there exists a player object 56 who satisfies all of the conditions 1 to 6 described below among the player objects 56 of the team A, display output of the player object 56 on the monitor 18 (a game screen) of the game machine B is restricted.

[Condition 1] The own team holds the ball object 58.
[Condition 2] The position kind of the opponent user's operation target player object 56 is a defender.
[Condition 3] The position kind is a forward.
[Condition 4] The position is within a predetermined area in front of the goal object 54 (hereinafter referred to as a goal front area) of the opponent team.
[Condition 5] The position is within a dead angle area of the opponent user's operation target player object 56.
[Condition 6] The first ability parameter value is larger than the second ability parameter value of the opponent user's operation target player object 56.

Here, note that the first ability parameter value is a parameter value indicating how well a player disappears from the view of another player, and the second ability parameter value is a parameter value indicating the ability to sense such an action of another player.

Figure 5:
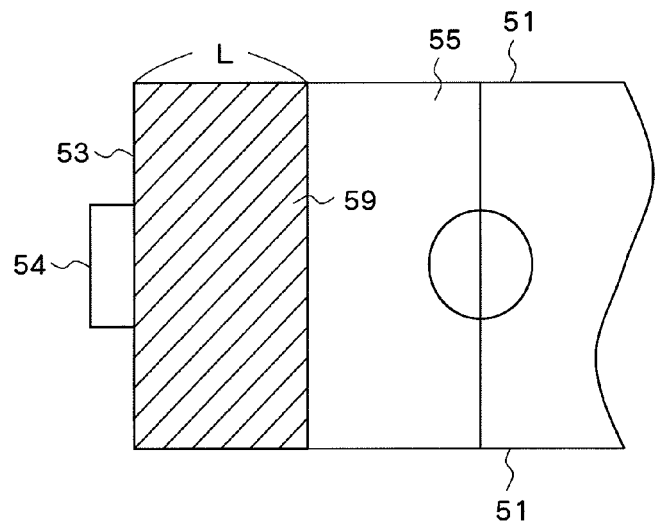
FIG. 5 is a diagram showing a goal front area.

FIG. 5 is a diagram explaining a goal front area. As shown, the goal front area 59 is an area within the court 55 and within a predetermined distance L from the goal line 53 on the goal object 54 side of the opponent team. Note that the court 55 is an area enclosed by the touch lines 51 and goal lines 53.

Figure 6:
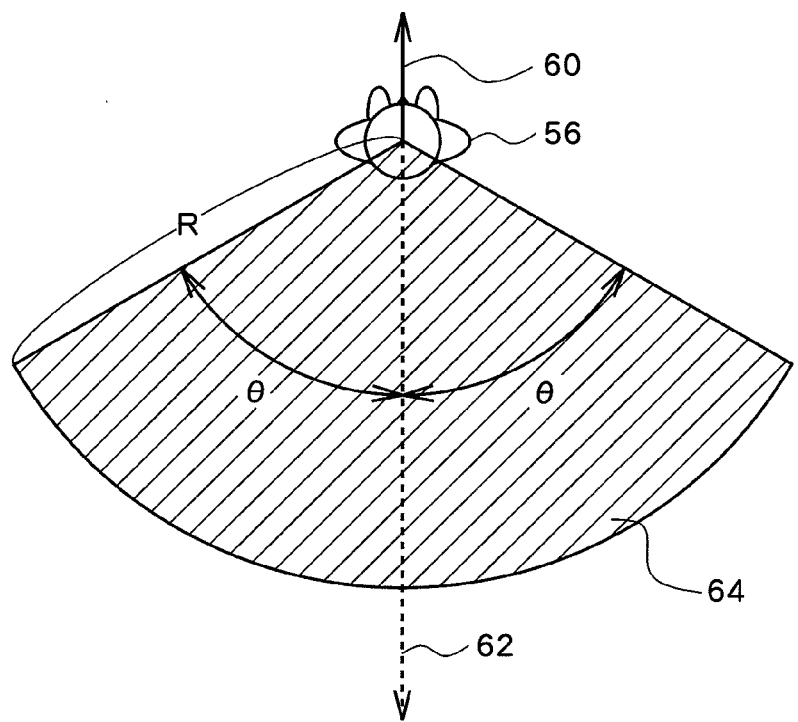
FIG. 6 is a diagram showing a dead angle area.

FIG. 6 is a diagram explaining a dead angle area. As shown, the dead angle area 64 of a player object 56 is a fan-like area in which the angle formed by the rear direction 62 (the direction opposite from the reference direction 60) of the player object 56 and a direction extending from the player object 56 is equal to or smaller than a predetermined reference angle ($\theta$), and the distance (the distance on the XZ plane system) from the player object 56 is equal to or shorter than a predetermined reference distance (R). Note that the reference direction 60 of the player object 56 may be the direction in which the body of the player object 56 is directed or the head thereof is directed (or the viewing direction of the player object 56). As described above, the dead angle area 64 is an area defined based on the position of the player object 56, and moves according to the movement of the player object 56.

Figure 7:
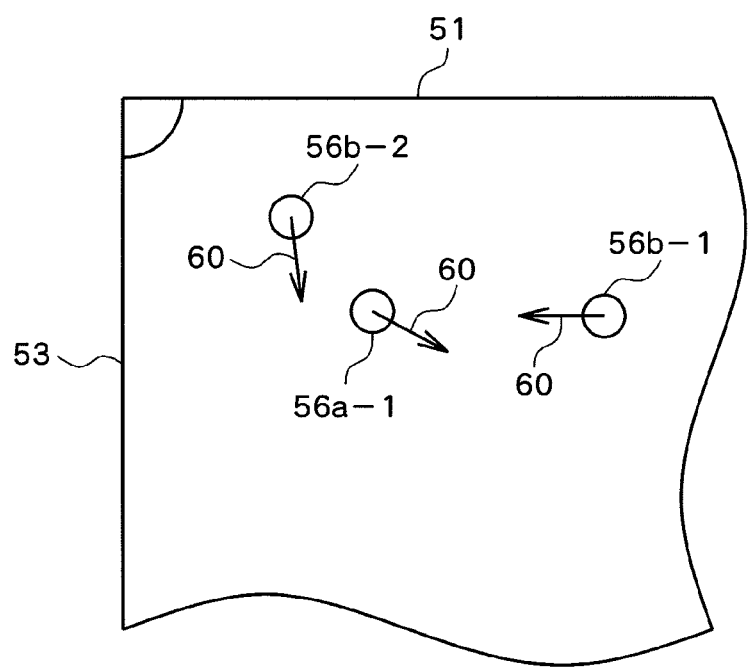
FIG. 7 is a drawing showing one example of a state in which player objects are placed.
Figure 8:
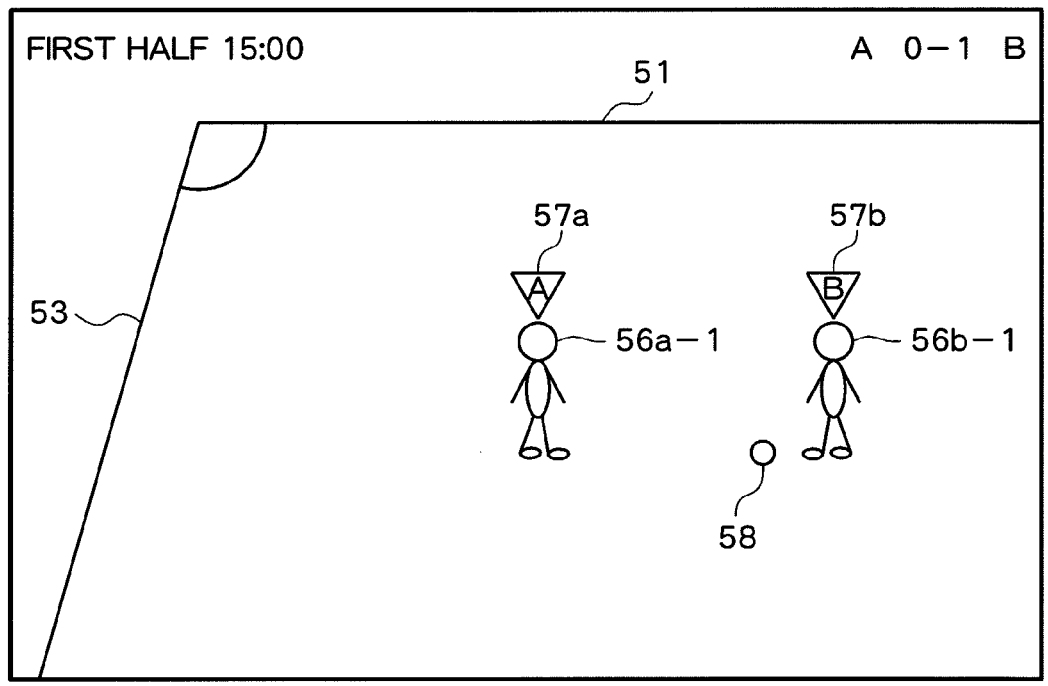
FIG. 8 is a drawing showing one example of a game screen image.

Assume a case in which the user A's operation target player object 56a-1, the user B's operation target player object 56b-1, and the player object 56b-2 of the team B are placed with the positions and orientation as shown in, e.g., FIG. 7 in the game space 50. In this case, when the player object 56b-2 satisfies all of the above described conditions 1 to 6, a game screen image such as is shown in FIG. 8 is shown on the monitor 18 of the game machine A. In this case, as shown in FIG. 8, the player object 56b-2 is not shown on the game screen of the game machine A. Therefore, the user A cannot realize the presence of the player object 56b-2. Accordingly, response to (defending against) the player object 56b-2 when, e.g., the player object 56b-2 receives the ball object 58 passed from the player object 56b-1 in response to a pass instruction operation made by the user B, is delayed.

Figure 9:
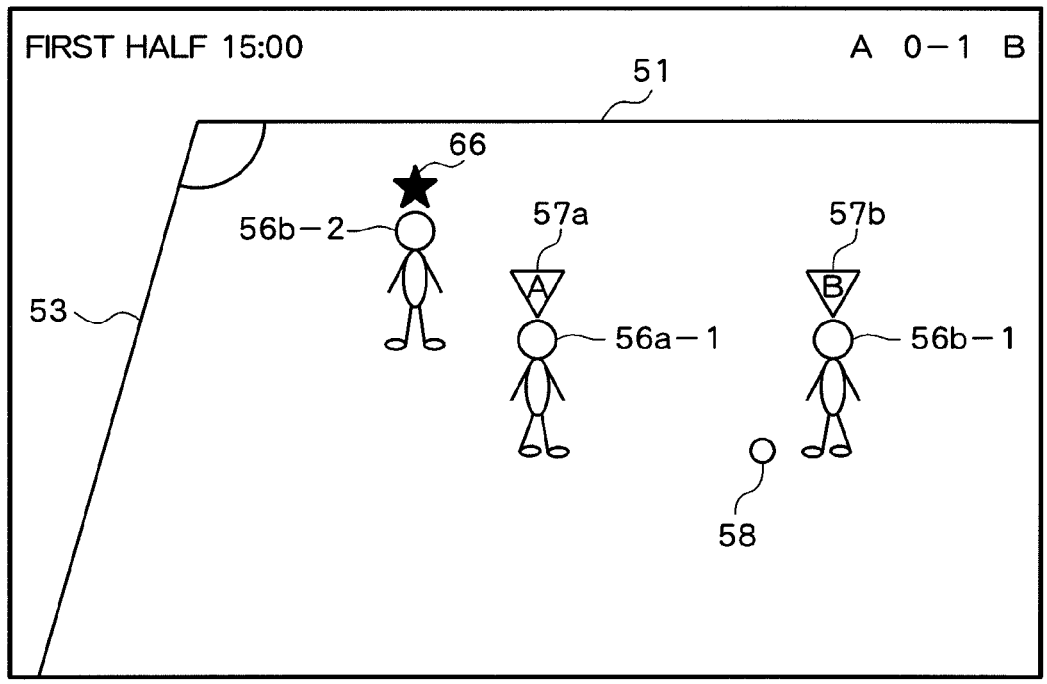
FIG. 9 is a drawing showing one example of a game screen image.

In the above, a game screen image such as is shown in FIG. 9 is shown on the monitor 18 of the game machine B. On the game screen of the game machine B, the player object 56b-2 is shown, as shown in FIG. 9, with the display restricted player indicator mark 66 shown above the player object 56b-2. Therefore, the user B can realize at a glance that it is highly likely that the user A does not realize the presence of the player object 56b-2 as the player object 56b-2 is not shown on the game screen of the game machine A, and therefore that use of the player object 56b-2 results in a situation advantageous to themselves. Note that the player object 56b-2 may be distinctively displayed by being shown in a manner different from others. For example, the player object 56b-2 may be shown blinking or in a predetermined color.

In the following, functions to be realized in the network game system 1 will be described. Note that in the network game system 1, either the game machine A or B has a server function so that the contents of operation carried out in the game machines A and B is reflected on the game screen images shown in the respective game machines A and B. The following description is based on the assumption that the game machine A has the server function.

Figure 10:
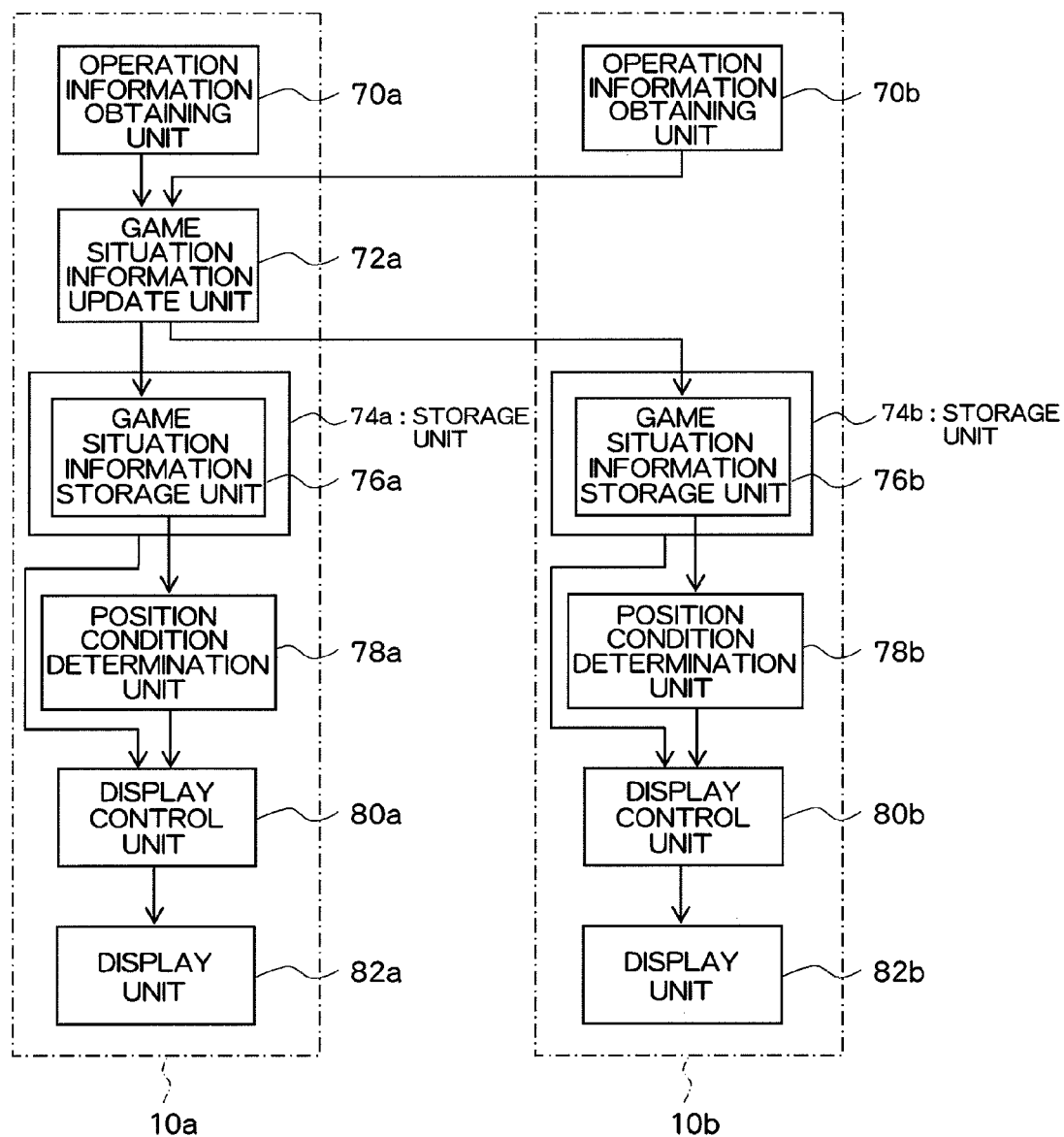
FIG. 10 is a functional block diagram of a network game system.

FIG. 10 is a functional block diagram mainly showing functions according to the present invention among those realized in the network game system 1. As shown, the network game system 1 comprises, in terms of functions, operation information obtaining units 70a, 70b, a game situation information update unit 72a, storage units 74a, 74b, position condition determination units 78a, 78b, display control units 80a, 80b, and display units 82a, 82b. Among these units, the operation information obtaining unit 70a, game situation information update unit 72a, storage unit 74a, position condition determination unit 78a, display control unit 80a, and display unit 82a are included in the game machine A 10a. These functions are realized in the game machine A 10a by executing a game program read from the DVD-ROM 25. The operation information obtaining unit 70b, storage unit 74b, position condition determination unit 78b, display control unit 80b, and display unit 82b are included in the game machine B 10b. These functions are realized in the game machine B 10b by executing a game program read from the DVD-ROM 25.

[1. Operation Information Obtaining Unit]

The operation information obtaining unit 70a is realized mainly using the microprocessor 14 and input/output processing unit 30 of the game machine A 10a. The operation information obtaining unit 70a obtains operation information corresponding to the contents of an operation carried out by the user A, based on an operation signal input from the controller 32. Similarly, the operation information obtaining unit 70b is realized mainly using the microprocessor 14 and input/output processing unit 30 of the game machine B 10b. The operation information obtaining unit 70b obtains operation information corresponding to the contents of an operation carried out by the user B, based on an operation signal input from the controller 32. Here, the operation information is information describing the contents of an operation carried out relative to, e.g., the respective operating members of the controller 32. The operation information obtained by the operation information obtaining units 70a, 70b is supplied to the game situation information update unit 72a of the game machine A 10a.

[2. Storage Unit]

The storage unit 74a is realized mainly using the main memory 26 and DVD-ROM 25 of the game machine A 10a. The storage unit 74b is realized mainly using the main memory 26 and DVD-ROM 25 of the game machine B 10b. In the storage units 74a, 74b, data describing the shapes of various objects, such as, e.g., the player object 56, ball object 58, and so forth, (data describing the coordinates of the respective vertexes of the polygons forming the various objects) is stored. Further, for example, motion data describing change in the posture of the player object 56 taking various actions are stored in the storage units 74a, 74b. Still further, ability parameter values (a pass ability parameter, a first ability parameter, a second ability parameter, and so forth) of the respective player objects 56 placed in the game space 50 are also stored in the storage units 74a, 74b. Each ability parameter is expressed by any numeric value between 0 and 100, with an ability parameter value with a higher numeric value indicating higher ability.

[3. Game Situation Information Storage Unit]

The storage units 74a, 74b respectively include the game situation information storage units 76a and 76b. The game situation information storage units 76a, 76b store game situation information describing the situation of a game. The game situation information includes information describing the states of, e.g., the respective player objects 56, ball object 58, and virtual camera placed in the game space 50. Here, "information describing the state of the player object 56" includes, e.g., information describing the position, posture, movement direction, moving speed of the player object 56 in the game space 50, information describing the position kind of the player object 56, information indicating whether or not the player object 56 holds the ball object 58, and information indicating whether or not the player object 56 is the user's operation target. The "information describing the state of the ball object 58" includes, e.g., information describing the position, movement direction, and moving speed of the ball object 58 in the game space 50. The "information describing the state of the virtual camera" includes, e.g., information describing the position (a viewpoint position), posture (a viewing direction), and an angle of view, and so forth of the virtual camera in the game space 50. The game situation information includes information describing a situation of a game, such as scores of the respective teams, a period of time elapsed after the match begins, and so forth.

In this embodiment, in the respective game situation information storage units 76a, 76b, player state tables describing the states of the player objects 56 of the respective teams are stored. FIG. 11 shows a part of the player state table. As shown in the drawing, the player state table includes "player ID", "position kind", "position", "orientation", "ball holding flag", and "operation target flag" fields. In the "player ID" field, a player ID for uniquely identifying each player object 56 placed in the game space 50 is stored. Note that a player object 56 having a player ID beginning with "A" belongs to the team A, and a player object 56 having a player ID beginning with "B" belongs to the team B. In the "position kind" field, the position kind of a player object 56 is stored. In the "position" field, the position coordinates of a representative point (e.g., a central point) of a player object 56 in the game space 50 are stored. In the "orientation" field, a unit vector indicating the reference direction 60 (e.g., the front direction or viewing direction) of a player object 56 is stored. In the "ball holding flag" field, information indicating whether or not a player object 56 holds the ball object 58 is stored. When the player object 56 does not hold the ball object 58, the "ball holding flag" field is set to 0, and when the player object 56 holds the ball object 58, the "ball holding flag" field is to 1. In the "operation target flag" field, information describing whether or not the player object 56 is the user's operation target is stored. When the player object 56 is not the user's operation target, the "operation target flag" field is set to 0. When the player object 56 is the user's operation target, the "operation target flag" field is set to 1.

Also, in the game situation information storage units 76a, 76b, display restriction tables which show display restriction states of the player objects 56 of the respective teams are stored. FIG. 12 shows one example of the display restriction table. As shown in the drawing, the display restriction table includes a "player ID" field and a "display restriction flag" field. In the "display restriction flag" field, information describing whether or not display output of a player object 56 on the game screen is restricted is stored. When display output on a game screen is not restricted, the "display restriction flag" field is set to 0. When display output on a game screen is restricted, the "display restriction flag" field is set to 1. The display restriction table stored in the game situation information storage unit 76a is updated based on the result of determination by the position condition determination unit 78a. The display restriction table stored in the game situation information storage unit 76b is updated based on the result of determination by the position condition determination unit 78b. Details of the updates will be described later.

[4. Game Situation Information Update Unit]

The game situation information update unit 72a is realized mainly using the microprocessor 14 of the game machine A 10a. The game situation information update unit 72a updates the game situation information stored in the game situation information storage units 76a, 76b.

For example, the game situation information update unit 72a updates the information describing the state of the user A's operation target player object 56, based on the operation information supplied from the operation information obtaining unit 70a. Also, for example, when a dribble instruction operation, a pass instruction operation, a shoot instruction operation, or the like is carried out while the user A's operation target player object 56 holds the ball object 58, the game situation information update unit 72a updates the information describing the state of the ball object 58, based on the operation information supplied from the operation information obtaining unit 70a.

Further, for example, the game situation information update unit 72a updates the information describing the state of the user B's operation target player object 56, based on the operation information supplied from the operation information obtaining unit 70b. Also, for example, when a dribble instruction operation, a pass instruction operation, a shoot instruction operation, and so forth is carried out while the user B's operation target player object 56 holds the ball object 58, the game situation information update unit 72a updates the information describing the state of the ball object 58, based on the operation information supplied from the operation information obtaining unit 70b.

Also, for example, the game situation information update unit 72a updates the information describing the states of the player objects 56 other than the users A and B' operation target player objects 56, according to a predetermined algorithm.

When game situation information stored in the game situation information storage unit 76a is updated, the game situation information update unit 72a reads the updated game situation information, and sends the read updated game situation information as game situation update information to the game machine B 10b. Alternatively, information describing the contents of update made after the last transmission of the game situation update information may be sent as game situation update information.

[5. Position Condition Determination Unit]

The position condition determination unit 78a is realized mainly using the microprocessor 14 of the game machine A 10a. The position condition determination unit 78a determines whether or not the position of a player object 56 (a second game character) included in the display target area, among the player objects 56 belonging to the team B, satisfies the position condition based on the position and orientation of the player object 56 (a first game character) belonging to the team A. Similarly, the position condition determination unit 78b is realized mainly using the microprocessor 14 of the game machine B 10b. The position condition determination unit 78b determines whether or not the position of a player object 56 (a second game character) included in the display target area, among the player objects 56 belonging to the team A, satisfies the position condition based on the position and orientation of the player object 56 (a first game character) belonging to the team B.

In this embodiment, the position condition determination units 78a, 78b determine whether or not the respective player objects 56 belonging to the respective teams A and B satisfy the above described conditions 1to 6. This determination is made based on the game situation information (a player state table (FIG. 11) and so forth) stored in the game situation information storage units 76a, 76b, and the ability parameters of the respective player objects 56, stored in the storage units 74a, 74b. The position condition determination units 78a, 78b update the display restriction table (FIG. 12), based on the result of the determination. More specifically, when the player object 56 does not satisfy any of the above described conditions 1 to 6, the display restriction flag (FIG. 12) of the player object 56 is updated to 0, and when the player object 56 satisfies the above described conditions 1 to 6, the display restriction flag (FIG. 12) of the player object 56 is updated to 1.

[6. Display Control Unit and Display Unit]

The Display control unit 80a is realized mainly using the microprocessor 14 and image processing unit 16 of the game machine A 10a. The display unit 82a is realized mainly using the monitor 18 of the game machine A 10a. The display control unit 80a produces a game screen image showing a picture viewed from the virtual camera, where the "game space 50 where the respective player objects 56 and ball object 58 are placed based on the game situation information stored in the game situation information storage unit 76a", and displays the game screen image on the display unit 82a.

In the above, the display control unit 80a (display restriction means) restricts display output of the player object 56 of the team B on the game screen of the display unit 82a, based on the display restriction table (FIG. 12) stored in the game situation information storage unit 76a. More specifically, with the display restriction flag of the player object 56 of the team B set to 1, the display control unit 80a does not show the player object 56 on the game screen even when the player object 56 is included within the display target area of the game space 50. Note that in the above, only the shadow of the player object 56 may be shown.

Also, with the display restriction flag of the player object 56 of the team A set to 1, the display control unit 80a (distinctive display means) distinctively shows the player object 56. For example, the display control unit 80a may show the player object 56 in a manner different from that of the other player objects 56. More specifically, the display control unit 80a may display the player object 56 blinking or in a predetermined color. Also, for example, the display control unit 80a shows a predetermined image at a position based on the display position of the player object 56 on the game screen. In this embodiment, with the display restriction flag of the player object 56 of the team A set to 1, the display control unit 80a shows the display restricted player indicator mark 66 at a predetermined position above the player object 56.

The display control unit 80b is realized mainly using the microprocessor 14 and image processing unit 16 of the game machine B 10b. The display unit 82b is realized mainly using the monitor 18 of the game machine B 10b. The display control unit 80b produces a game screen image showing a picture obtained by viewing, from the virtual camera, the "game space 50 where the respective player objects 56 and ball object 58 are placed based on the game situation information stored in the game situation information storage unit 76b", and shows the produced game screen image on the display unit 82b.

In the above, similar to the display control unit 80a, the display control unit 80b (display restriction means) restricts display output of the player object 56 of the team A on the game screen of the display unit 82b, based on the display restriction table (FIG. 12) stored in the game situation information storage unit 76b. More specifically, with the display restriction flag of the player object 56 of the team A set to 1, the display control unit 80b does not show the player object 56 on the game screen even when the player object 56 is included within the display target area of the game space 50.

Also, similar to the display control unit 80a, with the display restriction flag of the player object 56 of the team B set to 1, the display control unit 80b (distinctive display means) distinctively shows the player object 56. In this embodiment, with the display restriction flag of the player object 56 of the team B set to 1, the display control unit 80b shows the display restricted player indicator mark 66 at a predetermined position above the player object 56.

It should be noted that the display control units 80a, 80b may control the permeability (a degree of semi-transparency)

of the player object 56 to thereby restrict display output of the player object 56 on the game screen. More specifically, the display control units 80*a*, 80*b* may control the alpha values of the respective vertexes of the polygons forming the player object 56, to thereby restrict display output of the player object 56 on the game screen. For example, any integer value between 0 and 255 is usable for setting as an alpha value. In the case where a larger alpha value results in smaller permeability, the alpha values of the respective vertexes of the player object 56 with the display restriction flag set to 0 may be set to 255, and those with the display restriction flag set to 1 may be set to, e.g., 32, or the like. Note that a case in which a larger alpha value results in smaller permeability refers to a case in which a "player object 56 is completely transparent" with respect to the alpha value 0, and a "player object 56 is completely opaque" with respect to the alpha value 255.

Also, the display control units 80*a*, 80*b* control the display size of the player object 56, to thereby restrict display output of the player object 56 on the game screen. More specifically, with the player object 56 having the display restriction flag set to 1, the player object 56 may be shown smaller in size than normal.

In the following, processes to be carried out in the game machine A 10*a* and the game machine B 10*b* will be described. FIG. 13 is a flowchart of a process according to the present invention among those to be carried out in the game machine A 10*a* and the game machine B 10*b* every predetermined period of time (e.g., $1/60^{th}$ of a second). A game program for causing the microprocessor 14 to carry out this process is read from the DVD-ROM 2 in each of the game machine A 10*a* and the game machine B 10*b*, and carried out by the microprocessor 14, whereby the above described respective functional blocks (FIG. 10) are realized.

As shown in FIG. 13, the process from S102 to S105 is initially carried out in the game machine A 10*a* (S101: Y), and the process from S106 to S109 is initially carried out in the game machine B 10*b* (S101: N).

In the game machine A 10*a*, operation information describing the contents of an operation carried out by the user A is obtained based on an operation signal input from the controller 32 (S102). In addition, operation information sent from the game machine B 10*b* is obtained (S103). The operation information is information describing the contents of an operation carried out by the user B in the game machine B 10*b* (see S106 and S107). Then, the game situation information stored in the game situation information storage unit 76*a* is updated based on the operation information obtained at 5102 and 5103 (S104). Thereafter, the game situation information updated in the process at S104 is read from the game situation information storage unit 76*a*, and sent as game situation update information to the game machine B 10*b* (S105).

Meanwhile, in the game machine B 10*b*, operation information describing the contents of an operation carried out by the user B is obtained based on an operation signal input from the controller 32 (S106), and the operation information is sent to the game machine A 10*a* (S107). Further, in the game machine B 10*b*, whether or not the game situation update information from the game machine A 10*a* is received is determined (S108). In the case where it is determined that the game situation update information sent from the game machine A 10*a* is received (S108: Y), the game situation information stored in the game situation information storage unit 76*a* is updated based on the game situation update information (S109).

After the process from S102 to S105 or that from S106 to S109, a display restriction flag setting process is carried out (S110).

Figure 14:
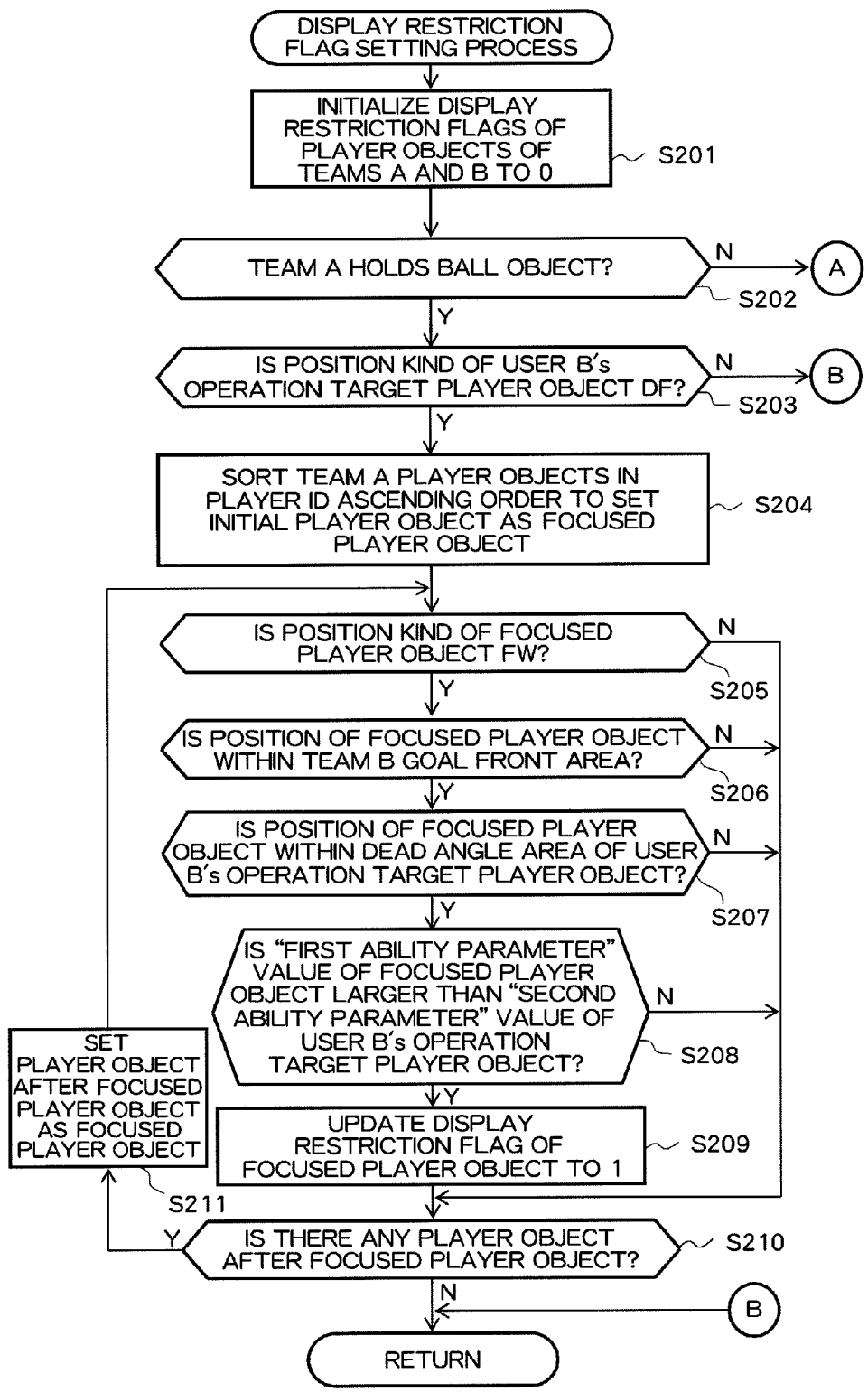
FIG. 14 is a flowchart of a process to be carried out in the game machine.
Figure 15:
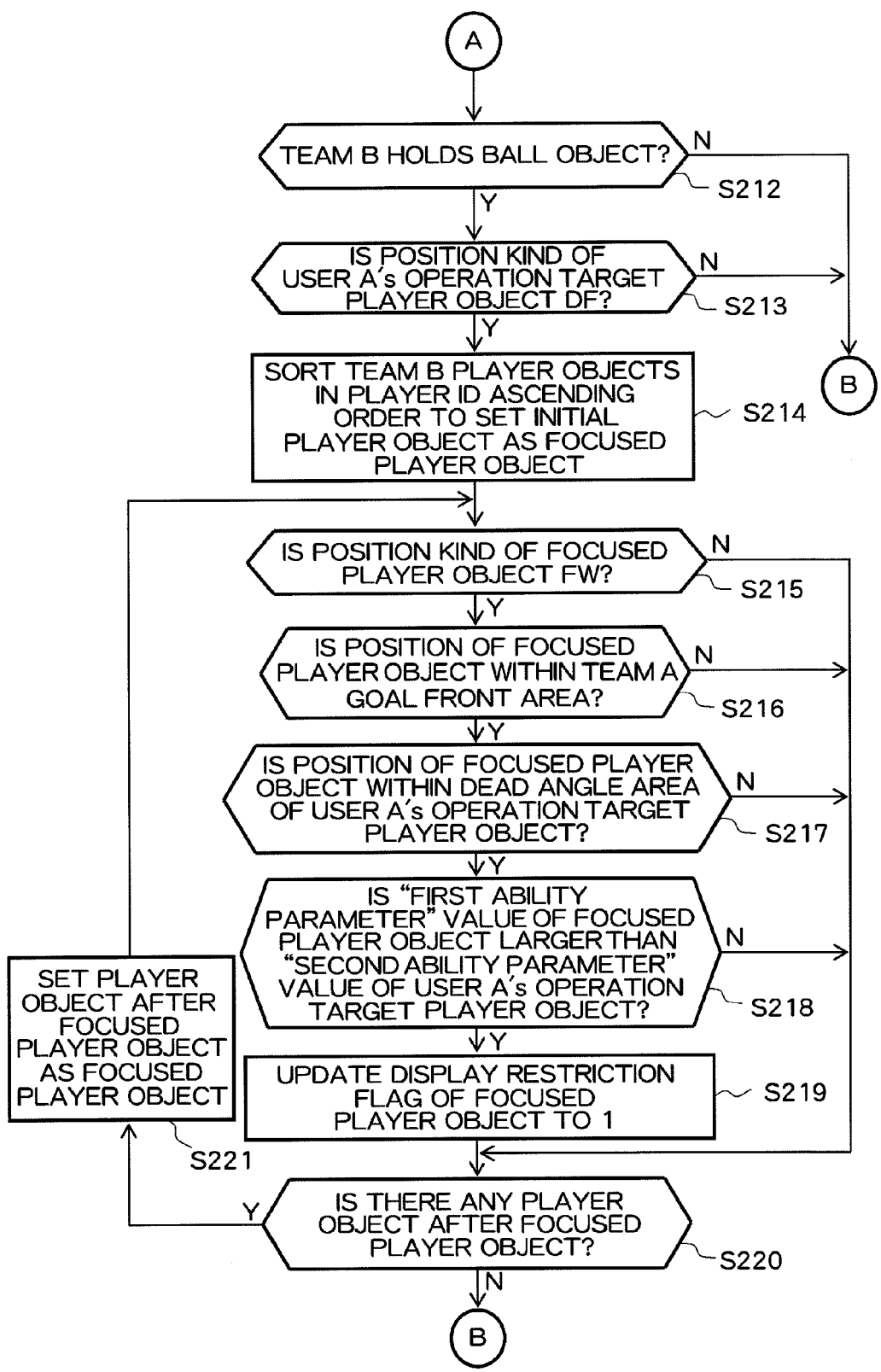
FIG. 15 is a flowchart of a process to be carried out in the game machine.

FIGS. 14 and 15 are flowcharts of the display restriction flag setting process. In the display restriction flag setting process, initially, the display restriction flags (FIG. 12) for the respective player objects 56 of the teams A and B are initialized to 0 (S201). Then, whether or not the team A holds the ball object 58 is determined (S202). This determination is made based on the game situation information.

In the case where it is determined that the team A holds the ball object 58 (S202: Y), a process to update the display restriction flag for the player object 56 of the team A (S203 to S211) is carried out. That is, while referring to the player state table (FIG. 11), whether or not the position kind of the user B's operation target player object 56 is a defender is determined (S203).

In the case where it is determined that the position kind of the user B's operation target player object 56 is not a defender (S203: N), this process is terminated. Meanwhile, in the case where the position kind of the user B's operation target player object 56 is a defender (S203: Y), the player objects 56 of the team A are sorted according to the ascending order of the player IDs', and the initial player object 56 is set as a focused player object (S204).

With the focused player object set, while referring to the player state table (FIG. 11), whether or not the position kind of the focused player object is a forward is determined (S205).

In the case where it is determined that the position kind of the focused player object is not a forward (S205: N), the process at S210 is carried out, without updating the display restriction flag (FIG. 12) for the focused player object to 1. Meanwhile, in the case where the position kind of the focused player object is a forward (S205: Y), while referring to the player state table (FIG. 11), whether or not the position of the focused player object is located within the goal front area 59 of the team B is determined (S206).

In the case where it is determined that the position of the focused player object is not located within the goal front area 59 of the team B (S206: N), the process at S210 is carried out without updating the display restriction flag (FIG. 12) for the focused player object to 1. Meanwhile, in the case where the position of the focused player object is located within the goal front area 59 of the team B (S206: Y), while referring to the player state table (FIG. 11), whether or not the position of the focused player object is located within the dead angle area 64 of the user B's operation target player object 56 is determined (S207).

More specifically, whether or not the angle formed by the rear direction 62 of the user B's operation target player object 56 and the direction extending from the user B's operation target player object 56 to the focused player object is equal to or smaller than a predetermined reference angle (θ) is determined. Further, the distance between the user B's operation target player object 56 and the focused player object is equal to or shorter than a predetermined reference distance (R) is determined. In the case where the above described angle is equal to or smaller than the reference angle (θ) and the above described distance is equal to or shorter than the reference distance (R), it is concluded that the position of the focused player object is located within the dead angle area 64 of the user B's operation target player object 56.

In the case where it is determined that the position of the focused player object is not located within the dead angle area 64 of the user B's operation target player object 56 (S207: N), the process at S210 is carried out without updating the display restriction flag (FIG. 12) for the focused player object to 1. Meanwhile, in the case where the position of the focused player object is located within the dead angle area 64 of the user B's operation target player object 56 (S207: Y), whether or not the first ability parameter value of the focused player object is larger than the second ability parameter value of the user B's operation target player object 56 is determined (S208).

In the case where it is determined that the first ability parameter value of the focused player object is equal to or smaller than the second ability parameter value of the user B's operation target player object 56 (S208: N), the process at 5210 is carried out without updating the display restriction flag (FIG. 12) for the focused player object to 1. Meanwhile, in the case where the first ability parameter value of the focused player object is larger than the second ability parameter value of the user B's operation target player object 56 (S208: Y), the display restriction flag (FIG. 12) for the focused player object is updated to 1 (S209).

After the process at S205 to S209, whether or not there exists another player object 56 after the focused player object is determined (S210). In the case where it is determined no player object 56 exists after the focused player object (S210: N), this process is terminated. Meanwhile, in the case where there another player object 56 exists after the focused player object (S210: Y), the player object 56 is set as a focused player object (S211), and the process at S205 to S209 is carried out. As described above, in the process for updating the display restriction flag for the player object 56 of the team A, the player objects 56 of the team A are sequentially set as a focused player object in the ascending order of the player IDs', and the process from S205 to S209 is carried out.

In the case where it is determined at S202 that the team A does not hold the ball object 58 (S202: N), whether or not the team B holds the ball object 58 is determined (S212). This determination is made based on the game situation information.

In the case where it is determined that the team B does not hold the ball object 58 (S212: N), this process is terminated. Meanwhile, in the case where the team B holds the ball object 58 (S212: Y), a process (S213 to S221) for updating the display restriction flag for the player object 56 of the team B is carried out. That is, while referring to the player state table (FIG. 11), whether or not the position kind of the user A's operation target player object 56 is a defender is determined (S213).

In the case where it is determined that the position kind of the user A's operation target player object 56 is not a defender (S213: N), this process is terminated. Meanwhile, in the case where the position kind of the user A's operation target player object 56 is a defender (S213: Y), the player objects 56 of the team B are sorted according to the ascending order of the player IDs', and the initial player object 56 is set as a focused player object (S214).

With the focused player object set, while referring to the player state table (FIG. 11), whether or not the position kind of the focused player object is a forward is determined (S215).

In the case where it is determined that the position kind of the focused player object is not a forward (S215: N), the process at S220 is carried out without updating the display restriction flag (FIG. 12) for the focused player object to 1. Meanwhile, in the case where the position kind of the focused player object is a forward (S215: Y), while referring to the player state table (FIG. 11), whether or not the position of the focused player object is located within the goal front area 59 of the team A is determined (S216).

In the case where it is determined that the position of the focused player object is not located within the goal front area 59 of the team A (S216: N), the process at S220 is carried out without updating the display restriction flag (FIG. 12) for the focused player object to 1. Meanwhile, in the case where the position of the focused player object is located within the goal front area 59 of the team A (S216: Y), while referring to the player state table (FIG. 11), whether or not the position of the focused player object is located within the dead angle area 64 of the user A's operation target player object 56 is determined (S217).

More specifically, the angle formed by the rear direction 62 of the user A's operation target player object 56 and the direction extending from the user A's operation target player object 56 to the focused player object is equal to or smaller than a predetermined reference angle (θ) is determined. Further, whether or not the distance between the user A's operation target player object 56 and the focused player object is equal to or shorter than a predetermined reference distance (R) is determined. In the case where it is determined that the above described angle is equal to or smaller than the reference angle (θ) and the above described distance is equal to or shorter than the reference distance (R), it is concluded that the position of the focused player object is included within the dead angle area 64 of the user A's operation target player object 56.

In the case where it is determined that the position of the focused player object is not located within the dead angle area 64 of the user A's operation target player object 56 (S217: N), the process at S220 is carried out without updating the display restriction flag (FIG. 12) for the focused player object to 1. Meanwhile, in the case where the position of the focused player object is located within the dead angle area 64 of the user A's operation target player object 56 (S217: Y), whether or not the first ability parameter value of the focused player object is larger than the second ability parameter value of the user A's operation target player object 56 is determined (S218).

In the case where it is determined that the first ability parameter value of the focused player object is equal to or smaller than the second ability parameter value of the user A's operation target player object 56 (S218: N), the process at 5220 is carried out without updating the display restriction flag (FIG. 12) for the focused player object to 1. Meanwhile, in the case where the first ability parameter value of the focused player object is larger than the second ability parameter value of the user A's operation target player object 56 (S218: Y), the display restriction flag (FIG. 12) for the focused player object is updated to 1 (S219).

After the processes from 5215 to S219, whether or not another player object 56 exists after the focused player object is determined (S220). In the case where it is determined that no player object 56 exists after the focused player object (S220: N), this process is terminated. Meanwhile, in the case where another player object 56 exists after the focused player object (S220: Y), the player object 56 is set as a focused player object (S221), and the process from S215 to S220 is carried out. As described above, in the process for updating the display restriction flag for the player object 56 of the team B, the player objects 56 of the team B are sequentially set as a focused player object in the ascending order of the player IDs', and the process from S215 to S220 is carried out.

It should be noted that in the process at S207 and S217, the values of the reference angle (θ) and reference distance (R) may be changed based on at least one of the first ability parameter value of the focused player object and the second ability parameter value of the user A or B's operation target player object 56. For example, as the first ability parameter value of the focused player object becomes larger, the value of the reference angle (θ) may also become larger. Also, for example, as the second ability parameter value of the user A or B's operation target player object 56 becomes larger, the value of the reference angle (θ) may become smaller. Also, for example, as the value obtained by subtracting the second ability parameter value of the user A or B's operation target player object 56 from the first ability parameter value of the focused player object becomes larger, the value of the reference angle (θ) may become larger.

After the process at S110 (the process from S201 to S221), a game screen image is produced (S111).

For example, in the game machine A 10a, an image showing a picture obtained by viewing, from the virtual camera, the "game space 50 where the respective player objects 56 and ball object 58 are placed, based on the game situation information stored in the game situation information storage unit 76a", is rendered into the VRAM. In the above, the display restriction table (FIG. 12) stored in the game situation information storage unit 76a is refereed to. In the case where any player object 56 having the display restriction flag set to 1 exists among the player objects 56 of the team B, rendering of the image of that player object 56 is restricted. Then, the player state table (FIG. 11) stored in the game situation information storage unit 76a is referred to. Then, the operation target player indicator mark 57a or 57b is overwritten into predetermined positions above the operation target player objects 56 of the users A and B in the image rendered in the VRAM. Also, the display restriction table (FIG. 12) stored in the game situation information storage unit 76a is referred to, and in the case where a player object 56 having the display restriction flag set to 1 exists among the player objects 56 of the team A, a display restricted player indicator mark 66 is overwritten into a predetermined position above the player object 56 in the image rendered in the VRAM. Further, a score image and an elapsed time image are overwritten into the image rendered in the VRAM. As described above, a game screen image (FIG. 8) is formed in the VRAM. The game screen image formed in the VRAM is displayed on the display unit 82a for output at a predetermined time.

Also, for example, in the game machine B 10b, an image showing a picture obtained by viewing, from the virtual camera, the "game space 50 where the respective player objects 56 and ball object 58 are placed, based on the game situation information stored in the game situation information storage unit 76b", is rendered into the VRAM. In the above, the display restriction table (FIG. 12) stored in the game situation information storage unit 76b is referred to. In the case where any player object 56 having the display restriction flag set to 1 exists among the player objects 56 of the team A, rendering of the image of that player object 56 is restricted. Then, the player state table (FIG. 11) stored in the game situation information storage unit 76b is referred to. The operation target player indicator marks 57a and 57b are overwritten into the respective predetermined positions above the users A and B' operation target player objects 56 in the image rendered in the VRAM. Also, the display restriction table (FIG. 12) stored in the game situation information storage unit 76b is referred to, and in the case where a player object 56 having the display restriction flag set to 1 exists among the player objects 56 of the team A, the display restricted player indicator mark 66 is overwritten into a predetermined position above the player object 56 in the image rendered in the VRAM. Further, a score image and an elapsed time image are overwritten into the image rendered in the VRAM. In this manner, a game screen image (FIG. 9) is formed in the VRAM. The game screen image formed in the VRAM is displayed on the display unit 82b for output at a predetermined time.

According to the above described network game system 1, a picture in which, when a forward player object 56 of one team moves so as to disappear from the view of a defender player object 56 of the other team, the defender player object 56 loses sight of the forward player object 56 can be preferably produced. For example, assume a case, as shown in FIG. 7, in which the user A's operation target player object 56a-1, the user B's operation target player object 56b-1, and the player object 56b-2 of the team B are placed in the game space 50. In this case, when the player object 56b-2 satisfies all of the above described conditions 1 to 6, the player object 56b-2 is not shown on the game screen of the game machine A 10a, such as is shown in FIG. 8. That is, the user A cannot realize the presence of the player object 56b-2. Thus, when the player object 56b-1 passes the ball object 58 to the player object 56b-2 in response to, e.g., a pass instruction operation made by the user B, response (defense) to the player object 56b-2 is delayed. That is, a picture in which the user A's operation target player object 56a-1 loses sight of the player object 56b-2 is preferably produced.

Also, in the network game system 1, the user can realize at a glance that a forward player object 56 of their own team moves so as to disappear from the view of a defender player object 56 of the opponent team. For example, assume a case, as shown in FIG. 7, in which the user A's operation target player object 56a-1, the user B's operation target player object 56b-1, and a player object 56b-2 of the team B are placed in the game space 50. In this case, for example, when the player objet 56b-2 satisfies all of the above described conditions 1 to 6, the display restricted player indicator mark 66 is shown above the player object 56b-2 shown on the game screen of the game machine B 10b, as shown in FIG. 9, whereby the player object 56b-2 is distinctively displayed. Therefore, the user B can understand at a glance that it is likely that the user A does not realize the presence of the player object 56b-2 as the player object 56b-2 is not shown on the game screen of the game machine A 10a, and therefore that use of the player object 56b-2 may result in a situation advantageous to themselves.

It should be noted that the present invention is not limited to the above-described embodiment.

For example, the network game system 1 may include a game server in addition to the game machine A 10a and the game machine B 10b. In this case, the contents of operations carried out by the users A and B may be reflected via the game server on the game screen images shown in the game machine A 10a and the game machine B 10b.

Also, for example, the network game system 1 may include three or more game machines 10. Also, for example, one team may be operated by a plurality of users.

Also, for example, in addition to the above described conditions 1 to 6, a condition stating that "a moving speed within the dead angle area 64 of the opponent user's operation target player object 56 is equal to or faster than a predetermined speed" may be added. Also, for example, the dead angle area 64 of the player object 56 may be defined as a fan-like area in which an angle formed by the "direction opposite to the direction from the player object 56 to the ball object 58" and a direction extending from the position of the player object 56 is equal to or smaller than a predetermined reference angle (θ), and the distance (a distance on the XZ plane system) from the player object 56 is within a predetermined reference distance (R).

Also, for example, in addition to the above described conditions 1 to 6, a condition stating that "the state of the player object 56 is changed from a state of not holding the ball object 58 to a state of holding the ball object 58" may be added. In other words, a condition stating that the "player object 56 receives the ball object 58 passed from a teammate player object 56" may be added. In the state shown in FIG. 7, for example, at a time when the player object 56b-2 shifts to the state of holding the ball object 58 after having received the ball object 58 from the player object 56b-1, display restriction of the player object 56b-2 on the game screen of the game machine A 10a may be effected.

Also, for example, in the display restriction flag setting process shown in FIGS. 14 and 15, the display restriction flag of the player object 56 satisfying the above described conditions 1 to 6, which is then set to 1, is changed to 0 at a time when the player object 56 no longer satisfies the above described conditions 1 to 6, whereby display restriction on the player object 56 is released. Alternatively, the display restriction flag of the player object 56 satisfying the above described conditions 1 to 6, which is then set to 1, may be changed to 0 after elapse of a predetermined period of time after a time when the above described conditions 1 to 6 are satisfied (that is, the display restriction begins), whereby display restriction on the player object 56 is released.

Also, for example, a game carried out in the game machine 10 is not limited to a soccer game, and may be, e.g., any sport game (a game, such as basketball, ice hockey, or the like, carried out using a moving body such as a ball, a puck, or the like) other than a soccer game. Also, a game carried out in the game machine 10 may be any game (an action game or the like) other than a sport game. The present invention can be applied to, e.g., a game system other than a so-called network game system. For example, the present invention can be applied to a game machine and so forth which includes a controller 32 and a monitor 18 for a user A and a controller 32 and monitor 18 for a user B. The present invention can be applied to a game machine for producing a game which requires preferable production of a picture in which a first game character loses sight of a second game character having moved so as to disappear from the view of the first game character.

The invention claimed is:

1. A game system including a first game machine and a second game machine, for displaying, on a first display unit corresponding to the first game machine, a picture of a display target area in a common game space where one or more first game characters corresponding to a team of the first game machine and one or more second game characters corresponding to a team of the second game machine are placed, the game system, comprising:
    position condition determination means for determining whether or not a position of a second game character included in the display target area among the one or more second game characters is within a dead angle area of a first game character, wherein the dead angle area of the first game character is set based on a position and orientation of the first game character; and
    display restriction means for restricting display of the second game character included in the display target area among the one or more second game characters on the first display unit, in a case where the second game character moves into the dead angle area of the first game character, based on a result of determination by the position condition determination means,
    wherein the position condition determination means determines whether the second game character is within a predetermined area in front of a goal object, and
    wherein the display restriction means restricts display of the second game character only when the second character is within the predetermined area in front of the goal object.

2. The game system according to claim 1, wherein the display restriction means controls a degree of semi-transparency of the second game character included in the display target area among the one or more second game characters, based on the result of determination by the position condition determination means.

3. The game system according to claim 2, wherein
    at least a part of the display target area is displayed on a second display unit corresponding to the second game machine,
    the display restriction means, in the case where the position of the second game character included in the display target area among the one or more second game characters is within the dead angle area of the first game character, restricts display of the second game character on the first display unit, and
    the game system includes distinctive display means, in the case where the position of the second game character included in the display target area among the one or more second game characters is within the dead angle area of the first game character, and the second game character is displayed on the second display unit, for distinctively displaying the second game character on the second display unit.

4. The game system according to claim 1, wherein the display restriction means controls a display size of the second game character included in the display target area among the one or more second game characters, displayed on the first display unit, based on the result of determination by the position condition determination means.

5. The game system according to claim 4, wherein
    at least a part of the display target area is displayed on a second display unit corresponding to the second game machine,
    the display restriction means, in the case where the position of the second game character included in the display target area among the one or more second game characters is within the dead angle area of the first game character, restricts display of the second game character on the first display unit, and
    the game system includes distinctive display means, in the case where the position of the second game character included in the display target area among the one or more second game characters is within the dead angle area of the first game character, and the second game character is displayed on the second display unit, for distinctively displaying the second game character on the second display unit.

6. The game system according to claim 1, wherein the position condition determination means includes means for determining whether or not an angle formed by a reference direction of the first game character and a direction from the first game character to the second game character is included in a predetermined angle range.

7. The game system according to claim 6, wherein
    at least a part of the display target area is displayed on a second display unit corresponding to the second game machine,
    the display restriction means, in the case where the position of the second game character included in the display target area among the one or more second game characters is within the dead angle area of the first game character, restricts display of the second game character on the first display unit, and the game system includes distinctive display means, in the case where the position of the second game character included in the display target area among the one or more second game characters is within the dead angle area of the first game character, and the second game character is displayed on the second display unit, for distinctively displaying the second game character on the second display unit.

8. The game system according to claim 6, wherein the position condition determination means includes means for controlling an angle range, based on a value assigned to at least one of the first game character and the second game character.

9. The game system according to claim 8, wherein
at least a part of the display target area is displayed on a second display unit corresponding to the second game machine,
the display restriction means, in the case where the position of the second game character included in the display target area among the one or more second game characters is within the dead angle area of the first game character, restricts display of the second game character on the first display unit, and
the game system includes distinctive display means, in the case where the position of the second game character included in the display target area among the one or more second game characters is within the dead angle area of the first game character, and the second game character is displayed on the second display unit, for distinctively displaying the second game character on the second display unit.

10. The game system according to claim 1, wherein
at least a part of the display target area is displayed on a second display unit corresponding to the second game machine,
the display restriction means, in the case where the position of the second game character included in the display target area among the one or more second game characters is within the dead angle area of the first game character, restricts display of the second game character on the first display unit, and
the game system includes distinctive display means, in the case where the position of the second game character included in the display target area among the one or more second game characters is within the dead angle area of the first game character, and the second game character is displayed on the second display unit, for distinctively displaying the second game character on the second display unit.

11. A game machine included in a game system, comprising:
display means for displaying a picture of a display target area in a common game space where one or more first game characters corresponding to a team of the game machine and one or more second game characters corresponding to a team of another game machine are placed, and
display restriction means for restricting display of a second game character included in the display target area among the one or more second game characters, on the display means, in a case where the second game character moves into a dead angle area of a first game character, based on a result of determination as to whether or not a position of the second game character included in the display target area, among the one or more second game characters, is within the dead angle area of the first game character, wherein the dead angle area of the first game character is set based on a position and orientation of the first game character,
wherein the display restriction means restricts the display of the second game character only when the second character is within a predetermined area in front of a goal object.

12. A control method for controlling a game machine included in a game system, the control method comprising:
displaying a picture of a display target area in a common game space where one or more first game characters corresponding to a team of the game machine and one or more second game characters corresponding to a team of another game machine are placed;
determining whether a second game character is within a predetermined area in front of a goal object; and
restricting, by one or more processors, display of a second game character included in the display target area among the one or more second game characters, in a case where the second game character moves into a dead angle area of a first game character, based on a result of determination as to whether or not a position of the second game character included in the display target area, among the one or more second game characters, is within the dead angle area of the first game character, wherein the dead angle area of the first game character is set based on a position and orientation of the first game character,
wherein the display of the second game character is restricted only when the second character is within the predetermined area in front of the goal object.

13. A non-transitory computer readable information storage medium recording a program for causing a computer to function as a game machine in a game system and performing a method comprising:
displaying a picture of a display target area in a common game space where one or more first game characters corresponding to a team of the game machine and one or more second game characters corresponding to a team of another game machine are placed;
determining whether a second game character, among the second game characters, is within a predetermined area in front of a goal object; and
restricting display of a second game character included in the display target area among the one or more second game characters, in a case where the second game character moves into a dead angle area of a first game character, based on a result of determination as to whether or not a position of the second game character included in the display target area, among the one or more second game characters, is within the dead angle area of the first game character, wherein the dead angle area of the first game character is set based on a position and orientation of the first game character,
wherein the display of the second game character is restricted only when the second character is within the predetermined area in front of the goal object.

14. A game system including a first game machine and a second game machine, for displaying, on a first display unit corresponding to the first game machine, a picture of a display target area in a common game space where one or more first game characters corresponding to a team of the first game machine and one or more second game characters corresponding to a team of the second game machine are placed, the game system, comprising:
one or more processors configured to:
determine whether or not a position of a second game character included in the display target area among the one or more second game characters is within a dead angle area of a first game character, wherein the dead angle area of the first game character is set based on a position and orientation of the first game character; and restrict display of the second game character included in the display target area among the one or more second game characters on the first display unit, in a case where the second game character moves into the dead angle area of the first game character wherein the display of the second game character is restricted only when the second character is within a predetermined area in front of a goal object.

15. A game machine included in a game system, comprising:

one or more processors configured to:

display, on a display unit, a picture of a display target area in a common game space where one or more first game characters corresponding to a team of the game machine and one or more second game characters corresponding to a team of another game machine are placed, and restrict display of a second game character included in the display target area among the one or more second game characters on the display unit, in a case where the second game character moves into a dead angle area of a first game character, based on a result of determination as to whether or not a position of the second game character included in the display target area, among the one or more second game characters, is within the dead angle area of the first game character, wherein the dead angle area of the first game character is set based on a position and orientation of the first game character, wherein the display of the second game character is restricted only when the second character is within a predetermined area in front of a goal object.

* * * * *